April 25, 1939. V. O. WELCH 2,155,627
OUTLET BOX ANCHORING DEVICE
Filed Jan. 27, 1938 2 Sheets-Sheet 1
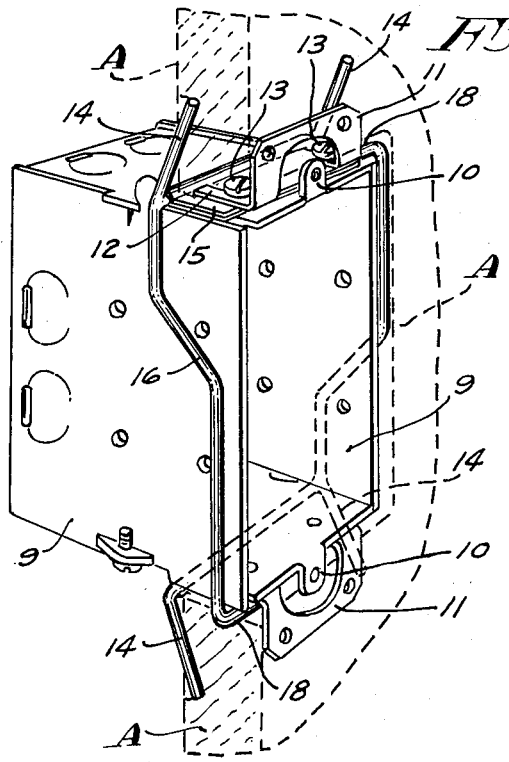
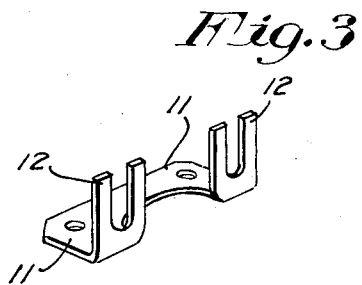
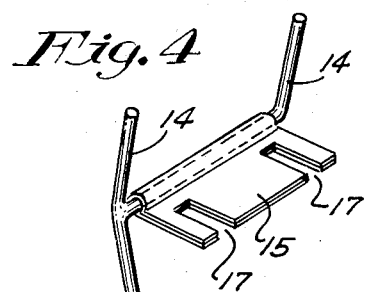
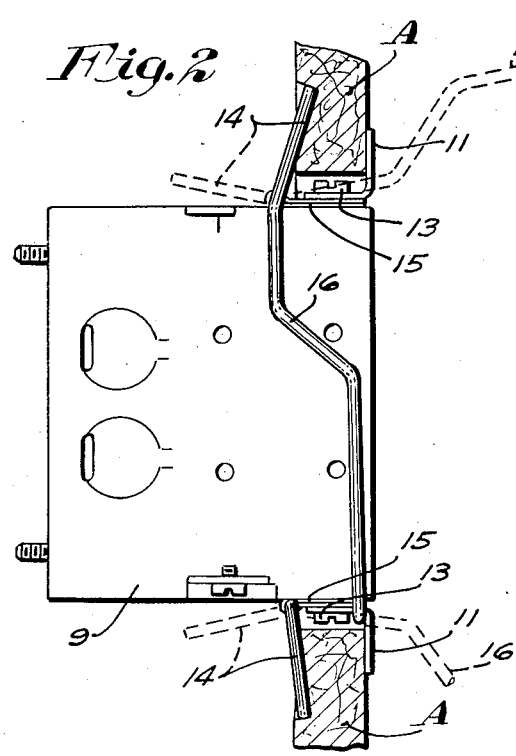
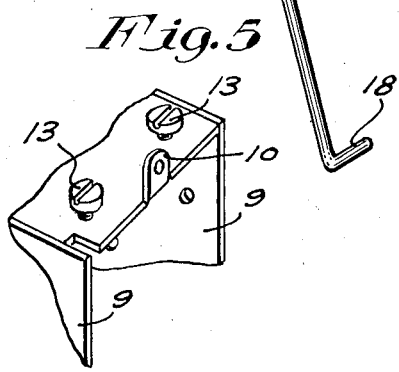
Inventor
Vern O. Welch
By his Attorney April 25, 1939.  V. O. WELCH  2,155,627

OUTLET BOX ANCHORING DEVICE

Filed Jan. 27, 1938 · 2 Sheets-Sheet 2

Inventor
Vern O. Welch
By his Attorneys

Patented Apr. 25, 1939

2,155,627

UNITED STATES PATENT OFFICE 2,155,627

OUTLET BOX ANCHORING DEVICE

Vern O. Welch, Milltown, Wis.

Application January 27, 1938, Serial No. 187,189

5 Claims. (Cl. 220—3.6)

My invention relates primarily to a simple and efficient means for anchoring electrical conduit outlet boxes to wall facings, but is capable of similar use for anchoring boxes or the like to wall structures. Generally stated, the invention consists of novel devices, combinations of devices and arrangement of parts hereinafter described and defined in the claims.

In the drawings of this application, the box is shown as a standard metallic outlet box of a form approved by underwriters and now extensively sold to the trade. The anchoring devices of my application are applied to the outlet box and are of such construction and arrangement that they clamp the wall facing at or adjacent to the four corners of the box, thereby securing the box in such a way that it will not wobble or move in any direction in respect to the wall facing. The wall facing, as is customary, is provided with rectangular holes through which the box may be freely inserted. The part here called the "wall facing", as illustrated in the drawings, is a heavy felted fiber sheet which takes the place of lathe and plaster, but in some instances the wall facing may be the lathe and plaster structure.

In the accompanying drawings which illustrate the invention, like characters indicate like parts throughout the several views.

Referring to the drawings:

Fig. 1 is a perspective showing an outlet box with my improved anchoring devices applied thereto, and with the box applied to the wall facing, the latter being indicated by dotted lines;

Fig. 2 is a side elevation of the structure illustrated in Fig. 1, the wall facing being shown in full line section;

Fig. 3 is a perspective showing one of the bracket-like stop flanges of the box removed therefrom;

Fig. 4 is a perspective showing one of the anchoring devices removed from the box;

Fig. 5 is a fragmentary perspective showing a portion of the outlet box with the stop flanges and anchoring devices removed therefrom;

Figure 6:
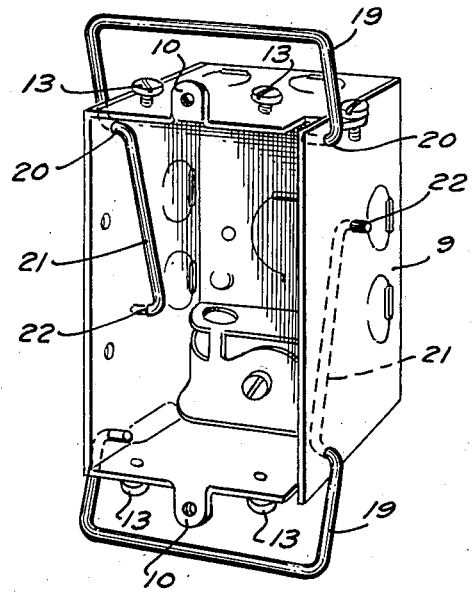
Fig. 6 is a perspective illustrating the modified form of the anchoring devices applied to the outlet box.

Attention is first called to Figs. 1 to 5 inclusive wherein the wall facing is indicated by the character A, and the outlet box is indicated as an entirety by the numeral 9. This outlet box, as illustrated, is provided with the customary face plate anchoring lugs 10 and with the customary bracket-like stop flanges 11, which latter are provided with the usual pronged base lugs 12 that are adjustably secured to the top and bottom of the box by screws 13. These stop flanges 11 are, as usual, made adjustably toward and from the open face of the box.

On each box there is a right hand and a left hand anchoring device, each of which comprises a clamping yoke 14, the rock shaft or transverse portion of which is journalled in a bearing plate 15. The rock shaft or transverse member of the one yoke 14 is provided at the right hand side with a clamping arm 16, and the other member is provided with a similar arm 16 at the left hand side of the box. The bearings 15 are applied one to the top, and one to the bottom of the box, and by means of the screws 13 are clamped to the box, but are capable of adjustment forwardly and rearwardly or toward and from the stop flanges 11. Preferably, as shown, these bearings 15 are made of thin sheet metal folded to form a bearing sleeve and with their flanges pressed together and provided with knotches 17 through which the screws 13 are passed. In fact, these bearings 15 can be slipped into position immediately under the slotted base portions 12, without removing the screws 13, but while the screws are loosened. When properly adjusted in respect to the thickness of the wall facing A, the screws will be tightened to rigidly clamp the parts in their adjusted positions.

In the structure illustrated in Figs. 1 to 5 inclusive the free ends of the arms 16 are bent laterally inward at 18 so that they can be sprung laterally under the stop flanges 11, as shown in Figs. 1 and 2. The adjustment of the bearings 15 and stop flanges 11 should be such that when the clamping devices are applied, as shown in Fig. 1, the prongs of the anchoring yokes 14 will be pressed tightly against, and usually more or less into, the wall facing. This very firmly anchors the box to the wall facing with clamping pressure at all four corners of the box so that wobbling or other movement of the box, with respect to the wall facing, is prevented. There will, of course, be sufficient springing action in the arms 16 and the anchoring yokes to set the anchoring devices under tension and to spring the ends 18 of the arms 16 into or out of engagement with the stop flanges 11.

The dotted lines in Fig. 2 indicate the adjustments of the clamping devices for application of the box into the opening of the wall facing and, of course, the anchoring or clamping devices will be sprung into full line positions after the box has been properly inserted. As is evident, there is no possibility of an outlet box or the like applied to the wall facing by these anchoring devices accidentally getting loose.

The anchor box shown in Fig. 6 is of the same structure as that shown in Figs. 1 to 5 inclusive, but the anchoring devices are of different design. The yoke-like clamping portions, herein called the anchoring yokes, are indicated at 19, and as shown, the yokes are reverse from that illustrated in Fig. 1, and their side members embrace the box and have end portions 20 passed inward through perforations in the sides of the box. One end 20 of each clamping yoke is provided with an extended arm 21 that is located on the inside of the box, close to the wall thereof. One arm 21 is on one side of the box and the other arm 21 is on the opposite side of the box. These arms 21 are provided with outwardly bent ends 22 that are insertable through perforations in the sides of the box to lock the anchoring or clamping devices to the wall facing and thereby clamp the box securely to the wall facing, which latter is not shown in Fig. 6.

Attention is called to the fact that the anchoring devices illustrated in Fig. 6 may be inserted in working position simply by passing the long ends or arms of the box through the perforations and into the interior of the box and then springing the short ends 20 through the perforations in the sides of the box. The spring tension in the arms 21 and in the yoke 19 will normally hold the ends 22 engaged with the perforations provided therefore in the sides of the box.

Figures 7, 8:
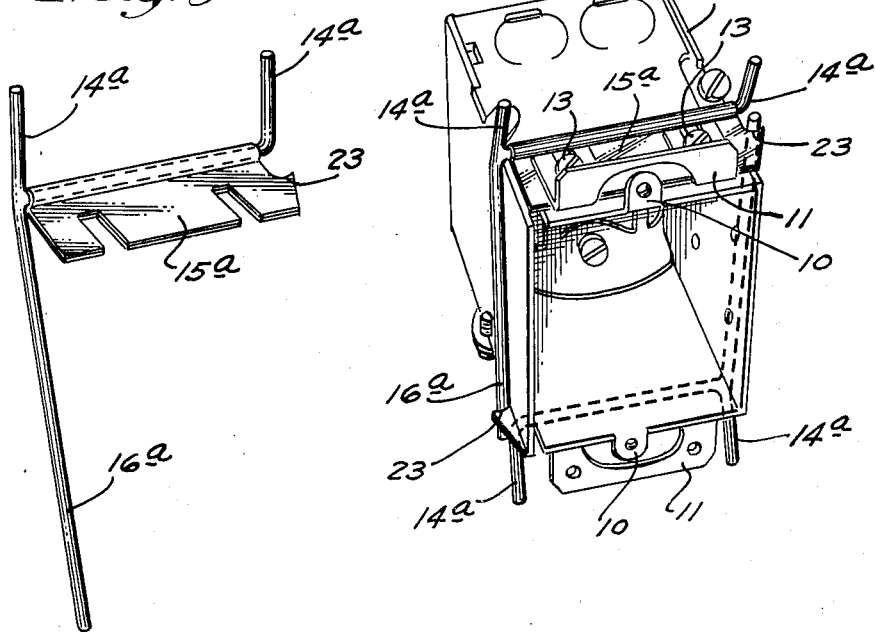
Fig. 7 is a perspective of an outlet box illustrating the slightly modified form of anchoring device.
Fig. 8 is a perspective of one of the anchoring devices of the structure illustrated in Fig. 7.

The structure illustrated in Figs. 7 and 8 may be assumed to be like that illustrated in Figs. 1 to 5 inclusive with the following exceptions. Here the clamping yokes 14a which, like the yokes 14, are pivoted in the bearings 15 and are provided at one side, close to the exterior of the box 9, with straight arms 16a that are adapted to be sprung into engagement with the beveled latch lugs 23 formed on the ends of bearings 15a which, except for the said lugs 23, are like the bearings 15. The arms 16a are, of course, on opposite sides of the box and hence the lugs 23 on the bearings 15a are at corresponding opposite sides of the box. Obviously the arms 16a will spring naturally back of the lugs 23 when the anchoring devices are forced to clamping positions, and said arms may be readily disengaged from said lugs to release the box simply by prying the free ends of the arms 16a slightly away from the box, by using a screw driver or any pointed instrument.

Outlet boxes equipped with the several clamping devices illustrated have been actually made and used and found highly efficient for the purpose in view. From the foregoing it will, of course, be understood that the structures illustrated are capable of modification within the scope of the invention herein disclosed and claimed; and that the said devices may be used as clamping devices for various articles that are to be applied to a wall facing or like structure.

In the specification and claims certain of the portions have been described as applied to the top and bottom of the outlet box. Let it be understood that that term is used in a liberal sense and that it would be clearly within the scope of the invention and claims to turn the structure so that what is treated as top and bottom of the box would be opposite sides of the box.

It is important to note that the two anchoring devices are not only applied as rights and lefts, but each anchoring device is an approximate L-shaped structure made up of a clamping bale and at one side of the bale an anchoring arm. An anchoring device of this kind may be, and as shown is, made of quite stiff wire. The two anchoring devices thus applied clamp the wall facing at the four corners of the box, and accomplishes this with two arms reversely extended, one on each side of the box.

What I claim is:

1. The combination with a box having wall engaging stops, of anchoring means therefor including two anchoring devices of like substantially L-shaped form, applied to the opposite ends of the box, as rights and lefts, each device involving a transverse clamping bale and an arm at one side of the bale, said bales having portions engageable with a wall facing at opposite sides of the box, and said arms being arranged at opposite sides of the box, extended in opposite directions, from the ends thereof, and arranged to be interlocked to the respective sides of the box.

2. The structure defined in claim 1 in which the clamping bales are in the form of transverse rods having projecting clamping ends.

3. The structure defined in claim 1 in which the clamping means of said clamping devices are in the form of bales with the inturned portions pivotally applied through the walls of the box.

4. The structure defined in claim 1 in which the clamping bales are in the form of transverse rods having projecting clamping ends, and bearings secured to said box and in which the transverse rods of said clamping bale are mounted.

5. Anchoring means for boxes of the kind described, involving two anchoring devices of like substantially L-shaped form, each device involving transverse clamping bale and an arm at one side of the bale, said bales having clamping portions engageable with a wall facing, at opposite sides of the box, said arms being arranged at opposite directions from the ends thereof.

VERN O. WELCH.